(12) United States Patent
Baba

(10) Patent No.: US 11,258,319 B2
(45) Date of Patent: Feb. 22, 2022

(54) MOTOR, COMPRESSOR, AND AIR CONDITIONING APPARATUS

(71) Applicant: Mitsubishi Electric Corporation, Tokyo (JP)

(72) Inventor: Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 25 days.

(21) Appl. No.: 16/961,798

(22) PCT Filed: Jan. 24, 2018

(86) PCT No.: PCT/JP2018/002051
§ 371 (c)(1),
(2) Date: Jul. 13, 2020

(87) PCT Pub. No.: WO2019/146006
PCT Pub. Date: Aug. 1, 2019

(65) Prior Publication Data
US 2021/0083536 A1     Mar. 18, 2021

(51) Int. Cl.
*H02K 1/27*       (2006.01)
*H02K 1/276*      (2022.01)
*H02K 1/28*       (2006.01)

(52) U.S. Cl.
CPC ............. *H02K 1/2773* (2013.01); *H02K 1/28* (2013.01)

(58) Field of Classification Search
CPC ......... H02K 1/2773; H02K 1/28; H02K 1/276
See application file for complete search history.

(56) References Cited

U.S. PATENT DOCUMENTS

2010/0026128 A1    2/2010  Ionel
2012/0242182 A1*   9/2012  Yabe ............... H02K 1/276
                                                  310/156.53
(Continued)

FOREIGN PATENT DOCUMENTS

JP   H10-285851 A   10/1998
JP   2002-247876 A   8/2002
(Continued)

OTHER PUBLICATIONS

Indian Office Action dated Mar. 18, 2021, issued in corresponding Indian patent application 202027029486 (and English translation).
(Continued)

*Primary Examiner* — Thomas Truong
(74) *Attorney, Agent, or Firm* — Posz Law Group, PLC

(57) ABSTRACT

A motor includes a rotor rotatable in a rotating direction about an axis, and a stator surrounding the rotor. A rotor core includes a magnet insertion hole corresponding to one magnetic pole, and a plurality of slits on an outer side of the magnet insertion hole in the radial direction. The slits include a first slit located most upstream in the rotating direction. Each slit has a tip portion and a root portion. The tip portion of the first slit is located upstream of the root portion of the first slit in the rotating direction, and is located upstream of a magnetic pole center in the rotating direction. The root portions of the slits are disposed more in number in a second region downstream of the magnetic pole center in the rotating direction than in a first region upstream of the magnetic pole center in the rotating direction.

18 Claims, 14 Drawing Sheets

(56) References Cited

U.S. PATENT DOCUMENTS

2016/0072347 A1 3/2016 Asaumi et al.
2017/0294814 A1* 10/2017 Baba .................... F25B 31/026

FOREIGN PATENT DOCUMENTS

| | | |
|---|---|---|
| JP | 2004-336999 A | 11/2004 |
| JP | 2013-093956 A | 5/2013 |
| JP | 5208088 B | 6/2013 |
| JP | 2013-183575 A | 9/2013 |
| JP | 2014-007853 A | 1/2014 |
| JP | 2014-217101 A | 11/2014 |

OTHER PUBLICATIONS

International Search Report of the International Searching Authority dated Apr. 17, 2018 for the corresponding International application No. PCT/JP2018/002051 (and English translation).
Office Action dated Dec. 30, 2021 in corresponding CN Application No. 201880086514.X (and English translation).

* cited by examiner

MOTOR, COMPRESSOR, AND AIR CONDITIONING APPARATUS

CROSS REFERENCE TO RELATED APPLICATION

This application is a U.S. national stage application of International Patent Application No. PCT/JP2018/002051 filed on Jan. 24, 2018, the disclosure of which is incorporated herein by reference.

TECHNICAL FIELD

The present invention relates to a motor, a compressor, and an air conditioning apparatus.

BACKGROUND

In a permanent magnet embedded motor, permanent magnets are inserted into magnet insertion holes formed in a rotor. When the motor is driven using an inverter, there are cases where the motor is rotated at high speed and high efficiency by field-weakening control (see, for example, patent reference 1).

PATENT REFERENCE

Patent Reference 1: Japanese Patent Application Publication No. 2002-247876

However, as the rotation speed of the motor increases, current flowing through a winding of a stator increase. Thus, magnetic flux (that is, stator magnetic flux) generated by the current flowing through the winding is likely to be concentrated on an upstream end portion of each permanent magnet in a rotating direction, and the end portion of the permanent magnet may be demagnetized.

SUMMARY

The present invention is made to solve the above described problem, and an object of the present invention is to suppress demagnetization of the permanent magnet.

A motor according to the present invention includes a rotor rotatable in a rotating direction about an axis, and a stator surrounding the rotor from an outer side in a radial direction about the axis. The rotor has a rotor core including a magnet insertion hole corresponding to one magnetic pole, and a permanent magnet disposed in the magnet insertion hole. The rotor core has a plurality of slits on an outer side of the magnet insertion hole in the radial direction. The plurality of slits include a first slit located most upstream in the rotating direction. Each of the plurality of slits has a tip portion which is an outer end in the radial direction, and a root portion which is an inner end in the radial direction. The first slit extends so that the tip portion of the first slit is located upstream of the root portion of the first slit in the rotating direction. The tip portion of the first slit is located upstream of a magnetic pole center in the rotating direction. The root portions of the plurality of slits are disposed more in number in a second region downstream of the magnetic pole center in the rotating direction than in a first region upstream of the magnetic pole center in the rotating direction.

According to the present invention, stator magnetic flux flowing toward the magnet insertion hole is guided to the downstream side in the rotating direction by the plurality of slits formed in the rotor core, and thus stator magnetic flux is suppressed from being concentrated on the upstream end portion of the permanent magnet in the rotating direction. Thus, it is possible to suppress demagnetization of the permanent magnet due to the concentration of the stator magnetic flux.

DETAILED DESCRIPTION

Embodiment 1

(Configuration of Motor)

Figure 1:
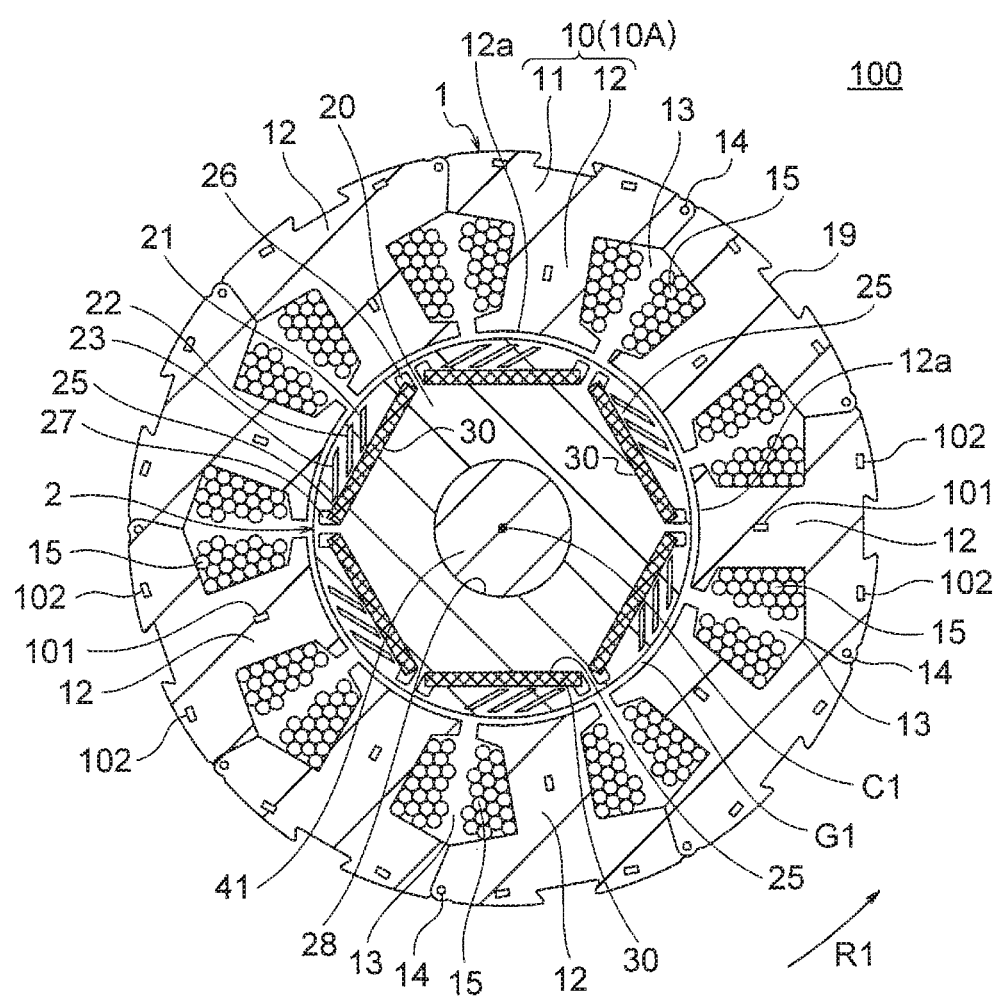
FIG. 1 is a sectional view illustrating a motor according to Embodiment 1.

A motor 100 according to Embodiment 1 of the present invention will be described. FIG. 1 is a sectional view illustrating the motor 100 according to Embodiment 1. The motor 100 is a permanent magnet embedded motor in which permanent magnets 30 are embedded in a rotor 2. The motor 100 is used in, for example, a compressor 500 (see FIG. 12) of an air conditioning apparatus 600 (see FIG. 13).

The motor 100 is a so-called inner-rotor type motor, and includes a stator 1, and a rotor 2 rotatably provided on an inner side of the stator 1. The rotor 2 rotates in a counter-clockwise direction in FIG. 1. A gap G1 of, for example, 0.75 mm is formed between the stator 1 and the rotor 2. In this regard, FIG. 1 is a sectional view taken along a plane perpendicular to the axis of rotation of the rotor 2.

Hereinafter, a direction of an axis C1 serving as an axis of rotation of the rotor 2 will be referred to as an "axial direction". A radial direction about the axis C1 will be referred to as a "radial direction", and a circumferential direction about the axis C1 will be referred to as a "circumferential direction". A rotating direction (the counterclockwise direction in FIG. 1) of the rotor 2 about the axis C1 will be referred to as a "rotating direction" (indicated by an arrow R1 in FIG. 1). In this regard, a "center in the circumferential direction" and a "center in the rotating direction" have the same meaning, and "both ends in the circumferential direction" and "both ends in the rotating direction" have the same meaning.

(Configuration of Stator)

The stator 1 includes a stator core 10, and windings 15 wound on the stator core 10. The stator core 10 is obtained by stacking a plurality of electromagnetic steel sheets as stack elements in the axial direction and fixing the sheets together by crimping or the like. A thickness of each of the electromagnetic steel sheets constituting the stator core 10 is, for example, 0.2 to 0.5 mm.

The stacked electromagnetic steel sheets are fixed together at, for example, crimping portions 102 (FIG. 4) formed on a yoke 11 and crimping portions 101 (FIG. 4) formed on teeth 12. However, positions of the crimping portions are not limited to these positions. Amorphous metal ribbons may be used in place of the electromagnetic steel sheets.

The stator core 10 includes a yoke 11 having an annular shape about the axis C1, and a plurality of teeth 12 extending inward in the radial direction (that is, a direction toward the axis C1) from the yoke 11.

The teeth 12 are arranged at equal intervals in the circumferential direction. Each tooth 12 has a tooth ends 12a at its inner end in the radial direction. The tooth end 12a has an arc-shaped end surface facing the outer circumference of the rotor 2.

Slots 13 are formed each between two teeth 12 adjacent to each other in the circumferential direction. The slots 13 are spaces in which the windings 15 are housed. The number of teeth 12 is nine in this example. However, the number of teeth 12 is not limited to nine, and it is sufficient that the number of teeth 12 is two or more.

The stator core 10 has a structure in which a plurality of split cores 10A each for one tooth 12 are connected in the circumferential direction. The number of split cores 10A is equal to the number of teeth 12 (in this example, nine). The split cores 10A are connected at connecting portions 14 formed on an outer circumferential side of the yoke 11. The connecting portions 14 are crimping portions or plastically deformable thin portions.

Figure 12:
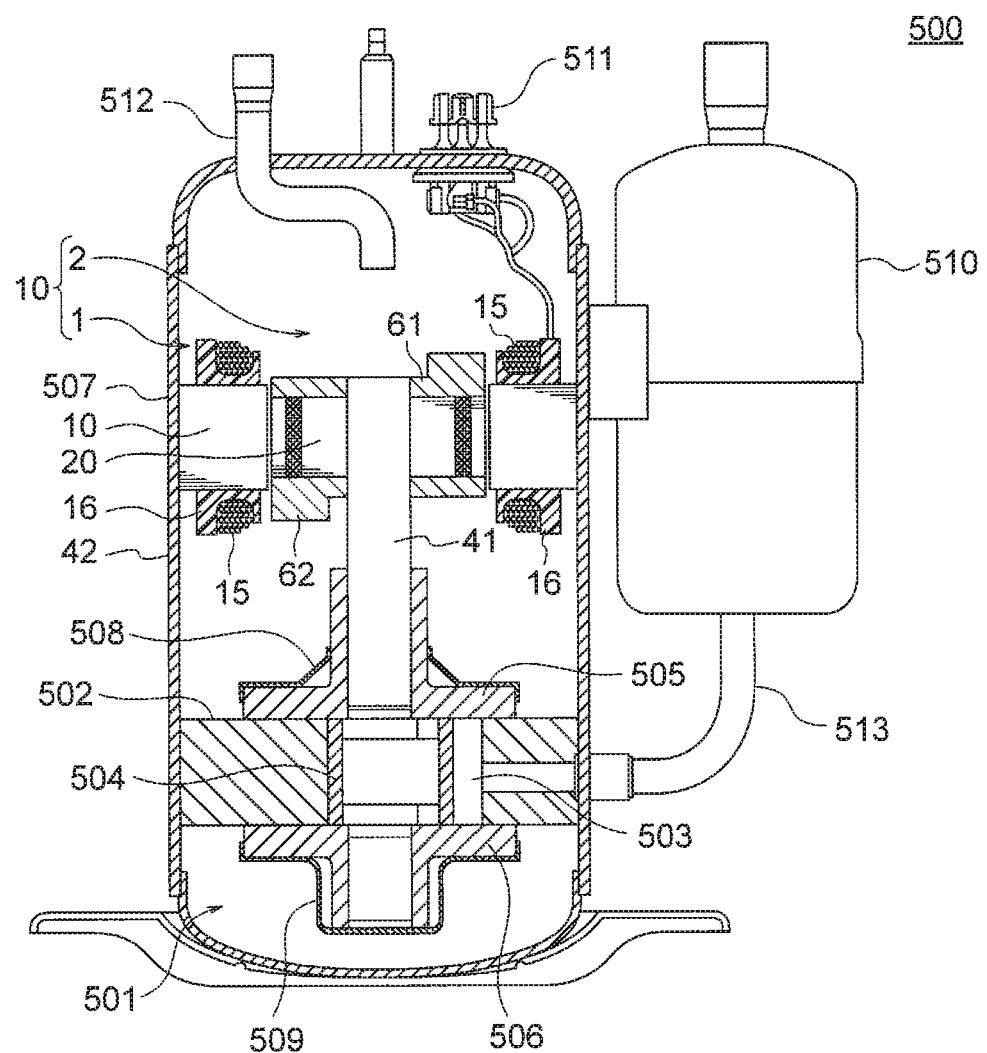
FIG. 12 is a sectional view illustrating a configuration of a compressor to which the motor according to each Embodiment is applicable.

The stator core 10 is fitted into a cylindrical frame 42 (FIG. 12) by shrink fitting, press fitting, or welding. The frame 42 is, for example, a part of a closed container 507 of the compressor 500 (FIG. 12).

The winding 15 is wound around each tooth 12 of the stator core 10. More specifically, the winding 15 is formed by winding, for example, a magnet wire having a diameter of 1.0 mm around each tooth 12 for 80 turns.

The winding 15 is wound in concentrated winding and is connected in Y-connection in this example. However, the winding 15 may be wound in distributed winding and may be connected in Δ-connection. The number of turns and the diameter of the winding 15 are determined in accordance with required characteristics (a rotation speed, torque or the like), an applied voltage, and a cross-sectional area of the slot 13.

Cutout portions 19 are formed on an outer circumferential surface of the yoke 11 of the stator core 10. The cutout portions 19 are portions at which the stator 1 is chucked with a jig in a winding process of the windings 15. The cutout portions 19 also serve as flow paths for lubricant oil and refrigerant in the compressor.

An insulating portion 16 (FIG. 12) made of a resin such as polybutylene terephthalate (PBT) is provided between the tooth 12 and the winding 15. The insulating portion 16 insulates the stator core 10 and the winding 15 from each other. The insulating portion 16 is formed by integrally molding a resin with the stator core 10, or fitting a resin compact to the stator core 10. In this regard, the insulating portion 16 is not illustrated in FIG. 1.

(Configuration of Rotor)

Figure 2:
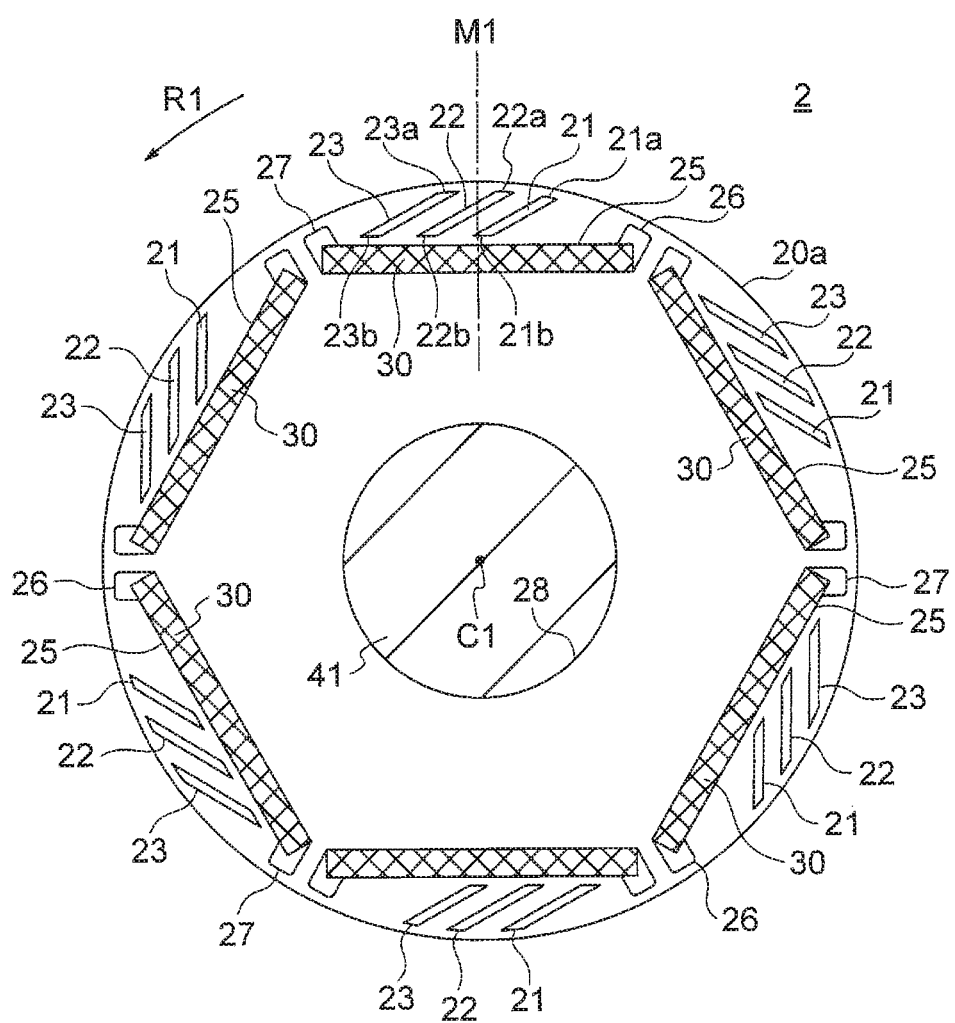
FIG. 2 is a sectional view illustrating a rotor of the motor according to Embodiment 1.

FIG. 2 is a sectional view illustrating the rotor 2. The rotor 2 includes a cylindrical rotor core 20, permanent magnets 30 attached to the rotor core 20, and a shaft 41 fixed at a center of the rotor core 20.

The rotor core 20 is obtained by stacking a plurality of electromagnetic steel sheets as stack elements in the axial direction, and fixing the sheets at both ends thereof in the axial direction using fixing members 61 and 62 (FIG. 12). A thickness of each of the electromagnetic steel sheets constituting the rotor core 20 is, for example, 0.2 to 0.5 mm. A shaft hole 28 into which the shaft 41 is fitted is formed at the center of the rotor core 20 in the radial direction.

A plurality of magnet insertion holes 25 into which the permanent magnets 30 are inserted are formed along an outer circumference 20a of the rotor core 20. The magnet insertion holes 25 are through-holes running through the rotor core 20 in the axial direction. The number of magnet insertion holes 25 is six in this example. Each magnet insertion hole 25 corresponds to one magnetic pole. In other words, the number of magnetic poles of the rotor 2 is six. However, the number of magnet insertion holes 25 (that is, the number of magnetic poles of the rotor 2) is not limited to six. It is sufficient that the number of magnet insertion holes 25 is two or more.

A center of each magnet insertion hole 25 in the circumferential direction is a magnetic pole center. A straight line in the radial direction passing through the magnetic pole center (that is, a straight line passing through the magnetic pole center and the axis C1) is referred to as a magnetic pole center line M1. In a plane perpendicular to the axis C1, each magnet insertion hole 25 extends linearly in a direction perpendicular to the magnetic pole center line M1. In the rotor core 20, a region between the magnet insertion holes 25 adjacent to each other in the circumferential direction is an inter-pole portion.

Each permanent magnet 30 is a flat plate member elongated in the axial direction, and has a width in the circumferential direction of the rotor core 20 and a thickness in the radial direction of the rotor core 20. The permanent magnet 30 has a thickness of, for example, 2 mm. The permanent magnets 30 are, for example, rare earth magnets containing neodymium (Nd), iron (Fe), and boron (B). The permanent magnets 30 are magnetized in the direction of thickness.

Although only one permanent magnet 30 is disposed in one magnet insertion hole 25 in this example, a plurality of permanent magnets 30 may be arranged side by side in the circumferential direction in one magnet insertion hole 25. In this case, the plurality of permanent magnets 30 in the same magnet insertion hole 25 are magnetized so that the same magnetic poles face outward in the radial direction.

Flux barriers (leakage magnetic flux suppression holes) 26 and 27 are formed on both sides of each magnet insertion hole 25 in the circumferential direction. The flux barrier 26 is located upstream of the magnet insertion hole 25 in the rotating direction, and the flux barrier 27 is located downstream of the magnet insertion hole 25 in the rotating direction. The flux barriers 26 and 27 suppress leakage magnetic flux between the adjacent permanent magnets 30.

A core portion between the outer circumference 20a of the rotor core 20 and each of the flux barriers 26 and 27 is a thin portion for suppressing short-circuit of the magnetic flux between adjacent magnetic poles. A thickness of the thin portion is desirably equal to the thickness of each of the electromagnetic steel sheets constituting the rotor core 20.

(Arrangement of Slits)

The rotor core 20 includes a plurality of slits 21, 22, and 23 on an outer side of each magnet insertion hole 25 in the radial direction. The number of slits is three in this example, but it is sufficient that the number of slits is two or more. The slits 21, 22, and 23 linearly extend parallel to each other. The slits 21, 22, and 23 are arranged at equal intervals in the circumferential direction.

The slits 21, 22, and 23 are referred to as a first slit 21, a second slit 22, and a third slit 23 in this order from the upstream side in the rotating direction indicated by the arrow R1.

The first slit 21 has a tip portion 21a which is an outer end (that is, end on the outer circumferential side) in the radial direction, and a root portion 21b which is an inner end (that is, end on the inner circumferential side) in the radial direction. The first slit 21 is inclined with respect to the magnetic pole center line M1 so that the tip portion 21a is located upstream of the root portion 21b in the rotating direction.

Similarly, the second slit 22 has a tip portion 22a which is an outer end in the radial direction, and a root portion 22b which is an inner end in the radial direction. The second slit 22 is inclined with respect to the magnetic pole center line M1 so that the tip portion 22a is located upstream of the root portion 22b in the rotating direction.

The third slit 23 has a tip portion 23a which is an outer end in the radial direction, and a root portion 23b which is an inner end in the radial direction. The third slit 23 is inclined with respect to the magnetic pole center line M1 so that the tip portion 23a is located upstream of the root portion 23b in the rotating direction.

In this regard, this embodiment is not limited to such an arrangement. It is sufficient that at least the first slit 21 of the slits 21, 22, and 23 is inclined with respect to the magnetic pole center line M1 so that the tip portion 21a is located upstream of the root portion 21b in the rotating direction.

Figure 3A:
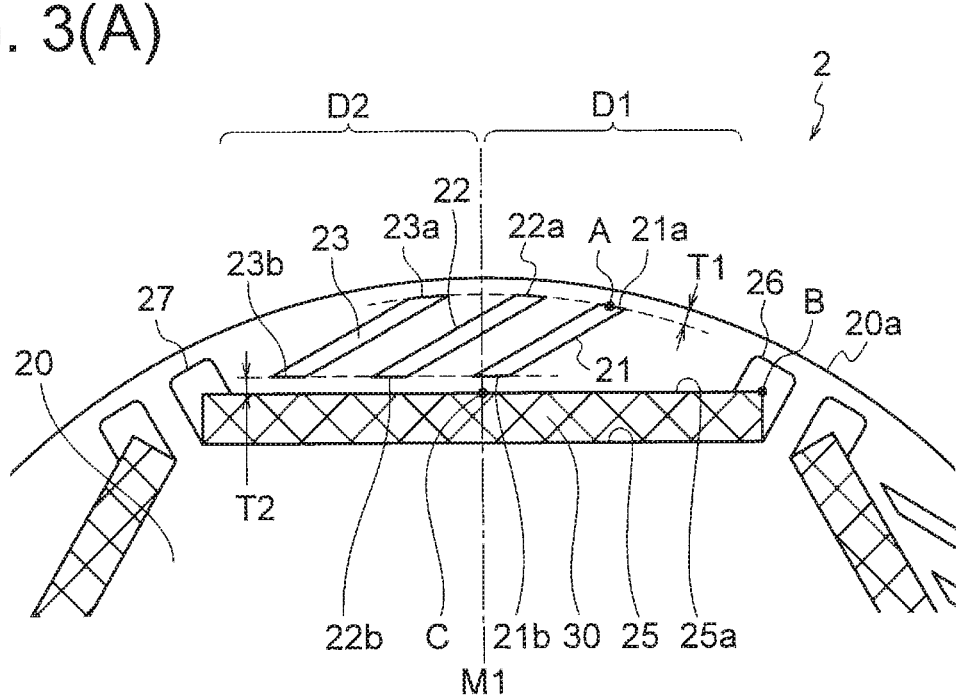
FIG. 3(A) is an enlarged schematic view illustrating a part of the rotor of the motor according to Embodiment 1.

FIG. 3(A) is an enlarged schematic view illustrating a part of the rotor 2. The tip portion 21a of the first slit 21 is formed along the outer circumference 20a of the rotor core 20, and the root portion 21b of the first slit 21 is formed along an outer end edge 25a of the magnet insertion hole 25 in the radial direction.

Similarly, the tip portion 22a of the second slit 22 is formed along the outer circumference 20a of the rotor core 20, and the root portion 22b of the second slit 22 is formed along the end edge 25a of the magnet insertion hole 25 on the outer side in the radial direction. The tip portion 23a of the third slit 23 is formed along the outer circumference 20a of the rotor core 20, and the root portion 23b of the third slit 23 is formed along the outer end edge 25a of the magnet insertion hole 25 in the radial direction.

The tip portion 21a of the first slit 21 and the tip portion 22a of the second slit 22 are located upstream of the magnetic pole center line M1 in the rotating direction. The tip portion 23a of the third slit 23 is located downstream of the magnetic pole center line M1 in the rotating direction. However, this embodiment is not limited to such a configuration. It is sufficient that the tip portion 21a of the first slit 21 is located upstream of the magnetic pole center line M1 in the rotating direction.

The root portion 21b of the first slit 21 is formed to intersect the magnetic pole center line M1. The root portion 22b of the second slit 22 and the root portion 23b of the third slit 23 are located downstream of the magnetic pole center line M1 in the rotating direction.

A region upstream of the magnetic pole center line M1 in the rotating direction in each magnetic pole is defined as a first region D1, and a region downstream of the magnetic pole center line M1 in the rotating direction in the magnetic pole is defined as a second region D2. The root portions 21b, 22b, and 23b of the slits 21, 22, and 23 are disposed more in number in the second region D2 than in the first region D1.

A minimum distance T2 from the root portion 21b of the first slit 21 to the magnet insertion hole 25 is greater than a minimum distance T1 from the tip portion 21a of the first slit 21 to the outer circumference 20a of the rotor core 20 (T2>T1). With this configuration, a path for magnetic flux from the permanent magnet 30 toward the stator 1 is provided on the outer side of the magnet insertion hole 25 in the radial direction. Therefore, magnetic flux emanating from the permanent magnet 30 effectively interlinks with the stator 1, and the output of the motor 100 is enhanced.

Similarly, the minimum distance T2 from the root portion 22b of the second slit 22 to the magnet insertion hole 25 is greater than the minimum distance T1 from the tip portion 22a of the second slit 22 to the outer circumference 20a of the rotor core 20. The minimum distance T2 from the root portion 23b of the third slit 23 to the magnet insertion hole 25 is greater than the minimum distance T1 from the tip portion 23a of the third slit 23 to the outer circumference 20a of the rotor core 20. This further enhances the output of the motor 100.

Although the minimum distances T1 from the slits 21, 22, and 23 to the outer circumference 20a of the rotor core 20 are the same, they may be different from each other. Similarly, although the minimum distances T2 from the slits 21, 22, and 23 to the magnet insertion hole 25 are the same, they may be different from each other.

Figure 3B:
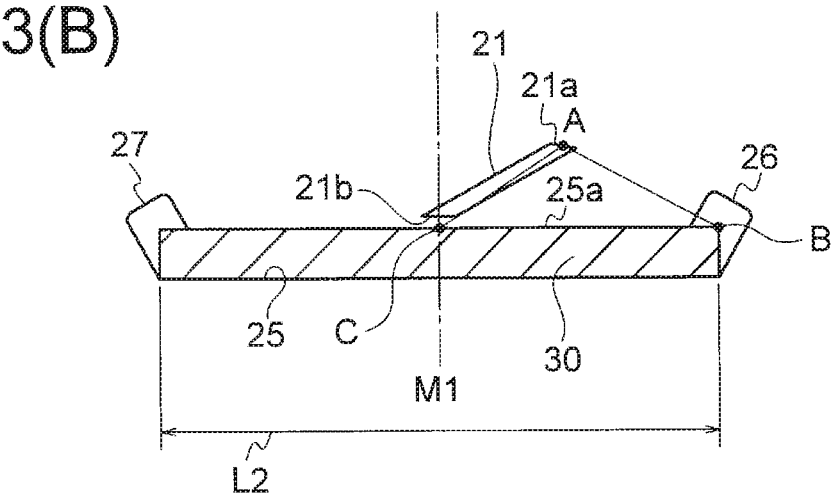
FIG. 3(B) is a schematic view illustrating a magnet insertion hole and a first slit.

FIG. 3(B) is a schematic view illustrating a relationship among the first slit 21, the magnet insertion hole 25, and the permanent magnet 30. In FIG. 3(B), a point A is defined as a point positioned at a center of the tip portion 21a of the first slit 21 in the circumferential direction. A point B is defined as a point positioned at an upstream end in the rotating direction of an outer end edge of the permanent magnet 30 in the radial direction. A point C is defined as a point positioned at the magnetic pole center on the outer end edge 25a of the magnet insertion hole 25 in the radial direction.

The points A, B, and C form an isosceles triangle having its apex at the point A. In other words, a distance from the point A to the point B is equal to a distance from the point A to the point C. With this configuration, magnetic flux (that is, stator magnetic flux) flowing from the stator 1 into the rotor core 20 is effectively guided by the first slit 21 to the downstream side in the rotating direction.

Figure 3C:
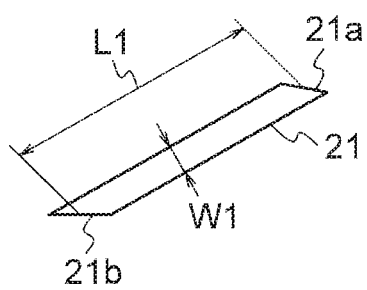
FIG. 3(C) is a schematic view illustrating a shape of the first slit.

FIG. 3(C) is a schematic view illustrating a shape of the first slit 21. The first slit 21 has a length L1 in a direction in which the first slit 21 extends. The length L1 is a distance between the center of the tip portion 21a in the circumferential direction and a center of the root portion 21b in the circumferential direction.

The length L1 of the first slit 21 is smaller than ½ of the length L2 (FIG. 3(B)) of the permanent magnet 30 in the circumferential direction. As the length L1 of the slit 21 is set in this manner, the first slit 21 does not excessively interrupt the magnetic flux of the permanent magnet 30, and this leads to an effect that the magnetic flux of the permanent magnet 30 effectively interlinks with the stator 1. Similarly, a length of the second slit 22 and a length of the third slit 23 are smaller than ½ of the length L2 of the permanent magnet 30 in the circumferential direction.

The first slit 21 has a width W1 in a direction perpendicular to the direction in which the first slit 21 extends (that is, the direction of the length L1). The width W1 of the first slit 21 is constant except for both ends in the direction in which the first slit 21 extends, that is, except for a region where the tip portion 21a is formed and a region where the root portion 21b is formed. This facilitates punching of the electromagnetic steel sheets, and thus simplifies the manufacturing process. Although not illustrated in FIG. 3(C), a width of the second slit 22 is constant except for both ends in a direction in which the second slit 22 extends, and a width of the third slit 23 is constant except for both ends in a direction in which the third slit extends.

The width W1 of the first slit 21 is smaller than twice the gap G1 between the rotor 2 and the stator 1. By setting the width W1 of the first slit 21 in this manner, the first slit 21 does not excessively interrupt the magnetic flux of the permanent magnet 30. This leads to an effect that the magnetic flux of the permanent magnet 30 effectively interlinks with the stator 1. Although not illustrated in FIG. 3(C), a width of the second slit 22 and a width of the third slit 23 are also smaller than twice the gap G1 between the rotor 2 and the stator 1.

The width W1 of the first slit 21 is larger than the thickness of each of the electromagnetic steel sheets constituting the rotor core 20. This facilitates punching of the electromagnetic steel sheets, and thus simplifies the manufacturing process. Although not illustrated in FIG. 3(C), the width of the second slit 22 and the width of the third slit 23 are also larger than the thickness of each electromagnetic steel sheet.

(Function)

A function of Embodiment 1 will be described next. In general, cooling and heating capacities of an air conditioning apparatus are controlled in accordance with the rotation speed of a motor used in a compressor. The motor is driven by an inverter. The motor rotates at high speed at the start of the air conditioning apparatus, and rotates at low speed after the room temperature reaches a set temperature.

The motor rotates at low speed for a long period of time, and thus the motor desirably exhibits high efficiency when the motor rotates at low speed. In order to enhance the cooling and heating capacities, however, the motor is desirably capable of rotating at a speed as high as possible.

A permanent magnet motor can be operated with lower current, as the number of turns of the winding of a stator increases. Thus, an inverter loss decreases, and highly efficient operation of the motor is enabled. However, an induced voltage increases in proportion to the number of turns of the winding, and the motor voltage dominated by the induced voltage reaches an inverter maximum output voltage at lower speed. This makes it difficult to further increase the rotation speed.

If the number of turns of the winding of the stator is reduced, the induced voltage decreases, and thus the motor can be rotated at higher speed. However, the current required to generate desired torque increases, and thus the inverter loss increases and the operation efficiency decreases.

As above, enhancement in the operation efficiency in low-speed rotation and enablement of high-speed rotation are issues to be solved. Therefore, in a recent permanent magnet motor, the number of turns of the winding of the stator is set relatively large, and field-weakening control is performed in high-speed rotation.

Figure 4:
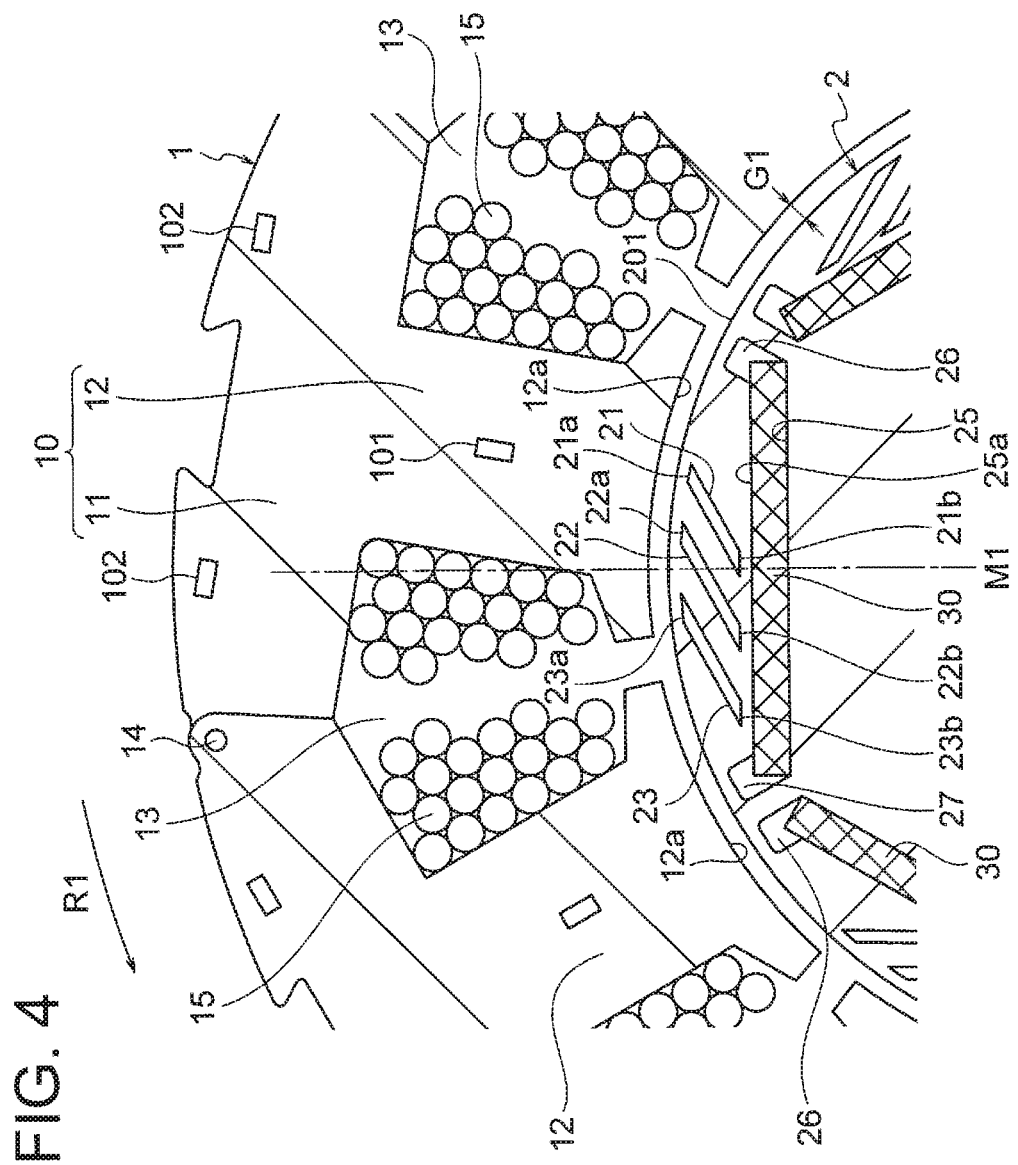
FIG. 4 is an enlarged sectional view illustrating a part of the motor according to Embodiment 1.
Figure 5:
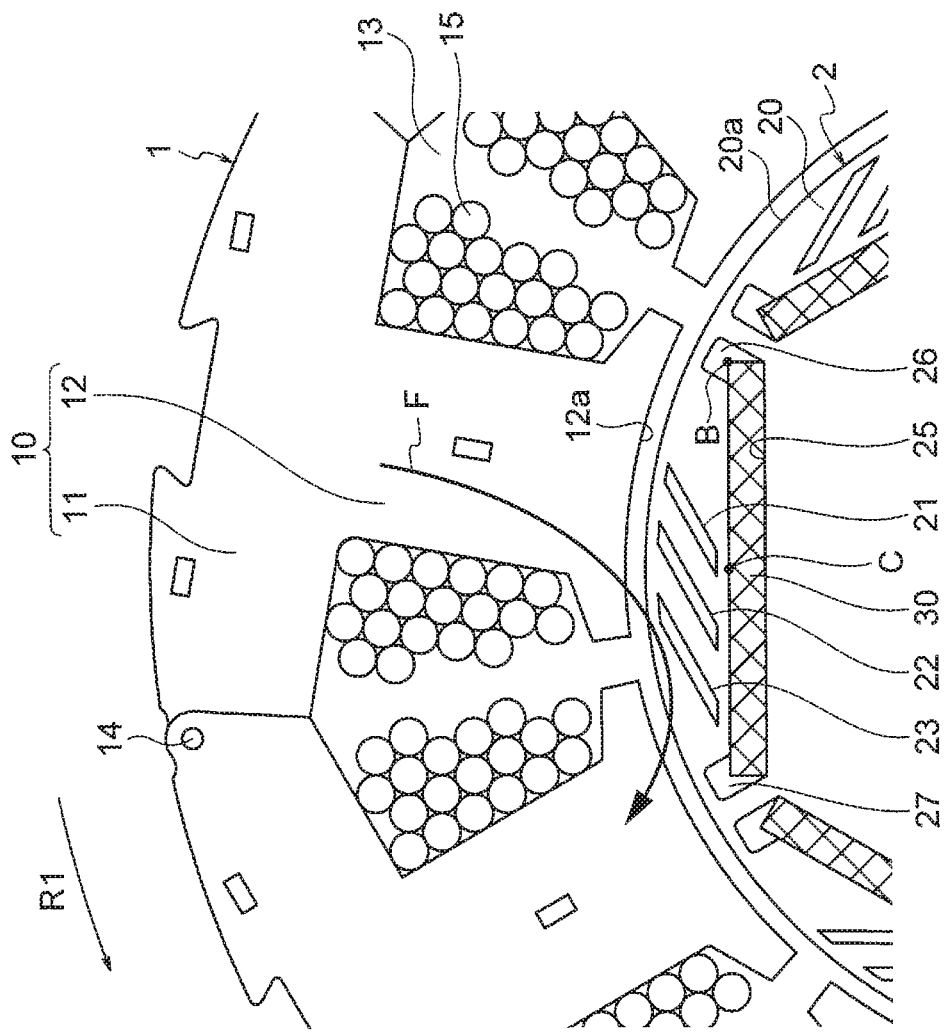
FIG. 5 is a schematic view for explaining a function of the motor according to Embodiment 1.

FIG. 4 is an enlarged schematic view illustrating a part of the motor 100. FIG. 5 is a schematic view for explaining magnetic flux flowing from the stator 1 to the rotor 2. An outer circumferential portion of the rotor 2 including the permanent magnet 30 faces the tooth 12 of the stator 1, as illustrated in FIG. 4. The action between magnetic flux generated by the permanent magnet 30 and magnetic flux generated by the winding 15 of the stator 1 produces torque, and accordingly the rotor 2 rotates.

Magnetic flux (that is, stator magnetic flux) F generated by the winding 15 of the stator 1 flows from the tooth 12 into the rotor core 20, as illustrated in FIG. 5. When field-weakening control is performed as described above, the current flowing through the winding 15 of the stator 1 increases, and the permanent magnet 30 is thus likely to be demagnetized by the stator magnetic flux. In particular, the stator magnetic flux is likely to be concentrated on the upstream end portion (that is, a portion including the point B) of the permanent magnet 30 in the rotating direction, and this end portion of the permanent magnet 30 is likely to be demagnetized.

Therefore, the rotor core 20 according to Embodiment 1 includes the slits 21, 22, and 23 on the outer side of the magnet insertion hole 25 in the radial direction. At least the first slit 21 of the slits 21, 22, and 23 extends to be inclined so that the tip portion 21a is located upstream of the root portion 21b in the rotating direction. The tip portion 21a of the first slit 21 is located upstream of the magnetic pole center line M1 in the rotating direction.

The stator magnetic flux (indicated by reference symbol F in FIG. 5) flowing into the rotor core 20 is guided by the slits 21, 22 and 23 to the downstream side in the rotating direction, and concentration of the stator magnetic flux F on the upstream end portion of the permanent magnet 30 in the rotating direction is relaxed. Thus, the stator magnetic flux can be distributed over the entire permanent magnet 30, and demagnetization at the upstream end portion of the permanent magnet 30 in the rotating direction can be suppressed.

Since demagnetization of the permanent magnet 30 is suppressed as above, an upper limit of the range of the rotation speed of the motor 100 in field-weakening control can be set higher, and the output of the motor 100 can thus be enhanced.

The root portions 21b, 22b, and 23b of the slits 21, 22, and 23 are disposed more in number in the region D2 downstream of the magnetic pole center line M1 in the rotating direction than in the region D1 upstream of the magnetic pole center line M1 in the rotating direction. Thus, the stator magnetic flux F can be guided to the downstream side in the rotating direction, and the magnetic flux emanating from the permanent magnet 30 can be made to effectively interlink with the stator 1 as described above. This makes it possible to enhance the output of the motor 100.

As long as at least the first slit 21 of the slits 21, 22, and 23 extends so that the tip portion 21a is located upstream of the root portion 21b in the rotating direction, an effect of suppressing demagnetization of the permanent magnet 30 can be obtained as described above. In addition, when each of the second slit 22 and the third slit 23 extends so that its tip portion is located upstream of its root portion in the rotating direction, demagnetization of the permanent magnet 30 can be more effectively suppressed.

(Driving Circuit)

Figure 6:
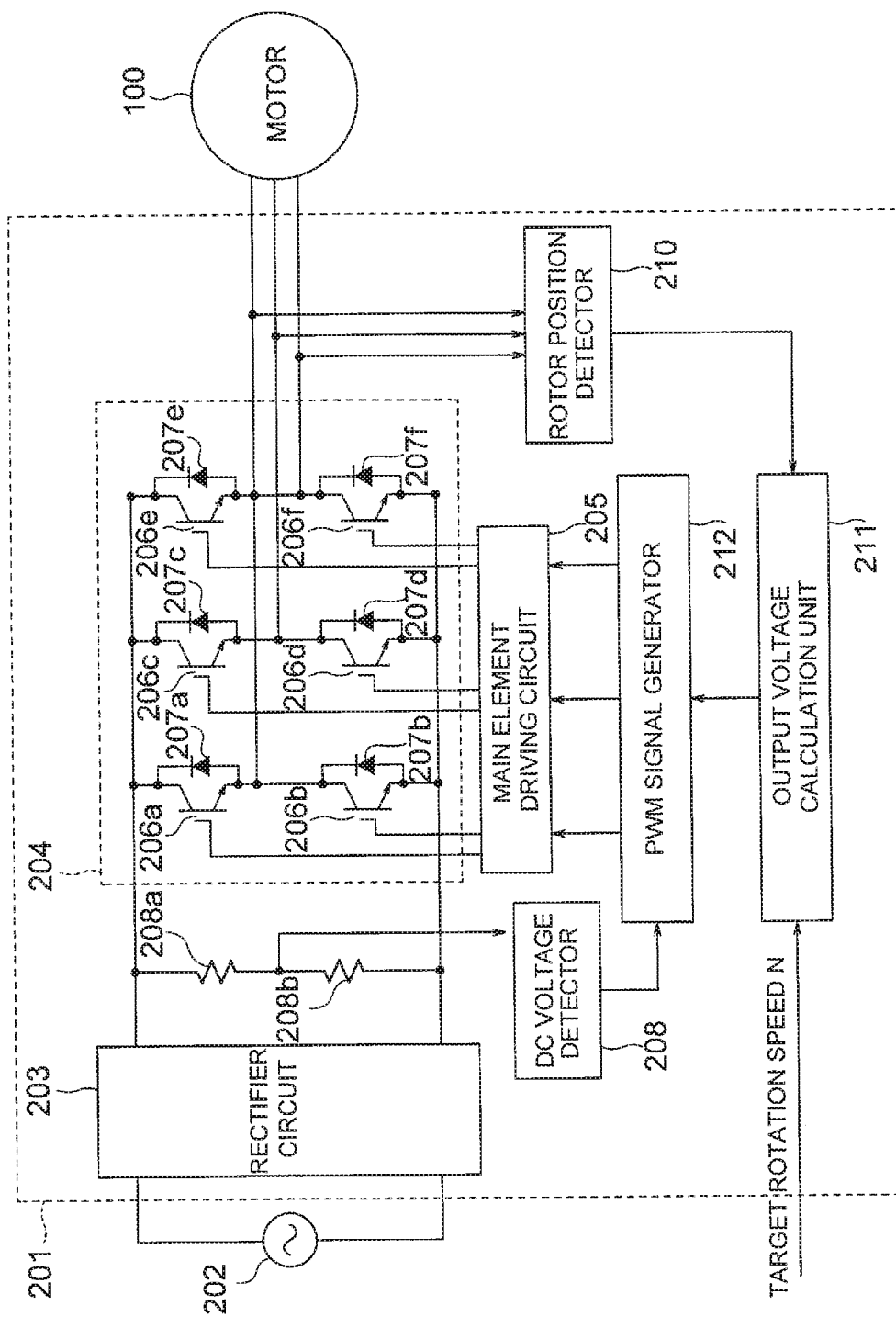
FIG. 6 is a block diagram illustrating a control system for the motor in Embodiment 1.

A driving circuit 201 as a driving device for driving the motor 100 will be described next. FIG. 6 is a block diagram illustrating the driving circuit 201 for the motor 100. The driving circuit 201 includes a rectifier circuit 203, an inverter main circuit 204 (inverter), and a main element driving circuit 205. The rectifier circuit 203 converts an AC voltage supplied from a commercial AC power supply 202 into a DC voltage. The inverter main circuit 204 converts the DC voltage output from the rectifier circuit 203 into an AC voltage, and supplies the AC voltage to the motor 100. The main element driving circuit 205 drives the inverter main circuit 204.

The driving circuit 201 further includes a DC voltage detector 208, a rotor position detector 210, an output voltage calculation unit 211, and a PWM (Pulse Width Modulation) signal generator 212. The DC voltage detector 208 detects the DC voltage output from the rectifier circuit 203. The rotor position detector 210 detects a terminal voltage of the motor 100 to detect a position of the rotor of the motor 100. The output voltage calculation unit 211 calculates an optimum output voltage of the inverter main circuit 204. The PWM signal generator 212 outputs a PWM signal to the main element driving circuit 205 based on the result of calculation by the output voltage calculation unit 211.

The rectifier circuit 203 includes, for example, a chopper circuit for raising the voltage supplied from the commercial AC power supply 202, and a smoothing capacitor for smoothing the rectified DC voltage.

The inverter main circuit 204 is a three-phase bridge inverter circuit. A switching unit of the inverter main circuit 204 includes six IGBTs (Insulated Gate Bipolar Transistors) 206a to 206f as inverter main elements, and six SiC-SBDs (Schottky Barrier Diodes) 207a to 207f as fast recovery diodes (FRDs) using silicon carbide (SiC). The SiC-SBDs 207a to 207f as FRDs serve as reverse current prevention means for suppressing counter electromotive forces generated when the IGBTs 206a to 206f change from ON to OFF.

In this example, the IGBTs 206a to 206f and the SiC-SBDs 207a to 207f are formed of a packaged IC module in which chips are mounted on the same lead frame and molded with epoxy resin. The IGBTs 206a to 206f may be implemented as IGBTs using silicon (Si-IGBTs), or alternatively may be implemented as IGBTs using SiC or GaN. Other switching elements such as MOSFETs (Metal-Oxide-Semiconductor Field-Effect Transistors) using Si, SiC, or GaN may be substituted for IGBTs.

Two voltage dividing resistors 208a and 208b connected in series are provided between the rectifier circuit 203 and the inverter main circuit 204. The DC voltage detector 208 samples and holds an electrical signal obtained by lowering a high DC voltage by a voltage divider circuit formed of the voltage dividing resistors 208a and 208b.

The AC power supplied from the inverter main circuit 204 is supplied to the windings 15 of the motor 100 via a glass terminal 511 (FIG. 12) of the compressor 500 to cause a rotating magnetic field to rotate the rotor 2.

The rotor position detector 210 detects position information of the rotor 2 and outputs the position information to the output voltage calculation unit 211. The output voltage calculation unit 211 calculates an optimum output voltage of the inverter main circuit 204 to be supplied to the motor 100, based on the position information of the rotor 2 and based on a target rotation speed command or information on operating conditions of the apparatus sent from outside the driving circuit 201. The output voltage calculation unit 211 outputs the calculated output voltage to the PWM signal generator 212.

The PWM signal generator 212 outputs a PWM signal for achieving the output voltage sent from the output voltage calculation unit 211, to the main element driving circuit 205 driving the IGBTs 206a to 206f of the inverter main circuit 204. The IGBTs 206a to 206f of the inverter main circuit 204 are switched by the main element driving circuit 205.

SiC used for the SiC-SBDs 207a to 207f is one of wide bandgap semiconductors. The "wide bandgap semiconductor" is a generic term for semiconductors having a wider bandgap than Si. Examples of the wide bandgap semiconductor include SiC, gallium nitride (GaN), diamonds or the like. The wide bandgap semiconductor, especially SiC, has a heat-resistant temperature, a dielectric breakdown strength, and a thermal conductivity which are higher than those of Si. In this example, SiC is used as the FRD of the inverter circuit, but other wide bandgap semiconductors may be used in place of SiC.

The motor 100 performs variable-speed driving under PWM control using the inverter main circuit 204 of the driving circuit 201 to thereby perform highly efficient operation in accordance with the required load conditions. The switching frequency (carrier frequency) of the inverter main circuit 204 varies depending on the type of switching element used for the main element driving circuit 205. For example, when GaN is used for the main element driving circuit 205, a waveform is generated at a frequency of about 100 kHz, and the driving voltage contains a high frequency generated by switching at a frequency higher than the operating frequency.

(Operation of Motor)

Figure 7A:
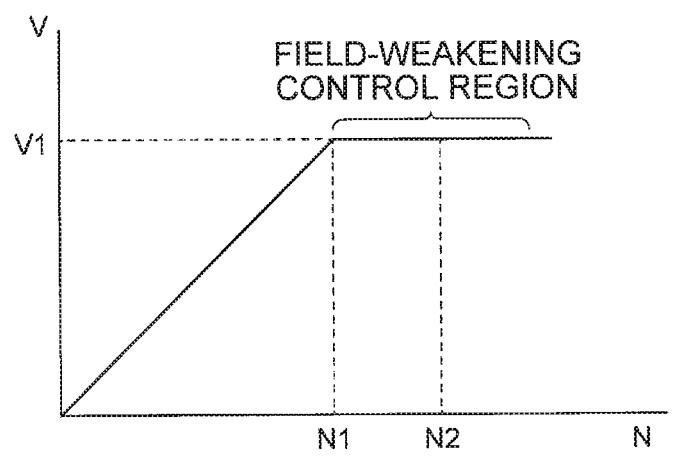
FIG. 7(A) is a graph illustrating a relationship between a motor voltage and a rotation speed in field-weakening control.
Figure 7B:
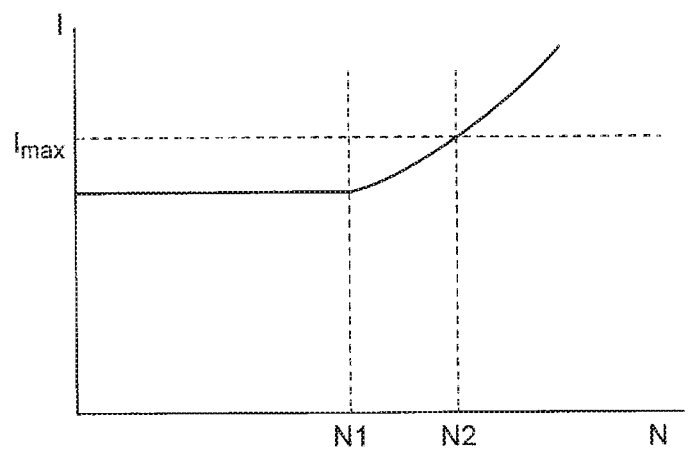
FIG. 7(B) is a graph illustrating a relationship between a current and the rotation speed in field-weakening control.

An operation of the motor 100 will be described next. FIG. 7(A) is a graph illustrating a relationship between the rotation speed N and the motor voltage V when the motor 100 according to Embodiment 1 is driven by the inverter. FIG. 7(B) is a graph illustrating a relationship between the rotation speed N and the motor current I.

As illustrated in FIG. 7(A), the motor voltage V of the motor 100 is roughly proportional to the rotation speed N of the motor 100 until the rotation speed N reaches a rotation speed N1 at which the motor voltage V reaches an inverter maximum output voltage V1. When the rotation speed N reaches the rotation speed N1, the motor voltage V reaches the inverter maximum output voltage V1. When the rotation speed N exceeds the rotation speed N1, field-weakening control is performed while the motor voltage V is maintained at the inverter maximum output voltage V1.

In field-weakening control, a d-phase current, i.e., a current in a direction to cancel the magnetic flux of the permanent magnet 30 is supplied to the winding 15. When field-weakening control is started, the motor current I sharply increases as illustrated in FIG. 7(B). The rotation speed N at which the motor current I reaches a motor current Imax which is a demagnetization limit of the permanent magnet 30 is defined as a rotation speed N2. Since rotation at a higher speed than the rotation speed N2 is impossible, a protection circuit is generally provided to keep the motor current I from exceeding Imax.

In the motor 100 according to this Embodiment 1, provision of the slits 21, 22, and 23 in the rotor 2 suppresses concentration of the stator magnetic flux on the upstream end portion of the permanent magnet 30 in the rotating direction, and thus demagnetization of the permanent magnet 30 is suppressed. Since demagnetization of the permanent magnet 30 is suppressed in this manner, it is possible to further increase the motor current I. In other words, the rotation speed N2 illustrated in FIG. 7(B) can be set higher. As a result, the output of the motor 100 can be enhanced.

Particularly, in applications such as a compressor or an electric vehicle in which the rotation speed of the motor 100 needs to be controlled over a wide range from low speed to high speed, it is possible to achieve both of enhancement in efficiency in low-speed rotation and enhancement in output in high-speed rotation.

Effects of Embodiment

As described above, according to Embodiment 1 of the present invention, the rotor core 20 includes a plurality of slits 21, 22, and 23 on the outer side of the magnet insertion hole 25 in the radial direction, and the first slit 21 located most upstream in the rotating direction extends to be inclined so that the tip portion 21a is located upstream of the root portion 21b in the rotating direction. The tip portion 21a of the first slit 21 is located upstream of the magnetic pole center in the rotating direction. The root portions 21b, 22b, and 23b of the slits 21, 22, and 23 are disposed more in number in the second region D2 downstream of the magnetic pole center than in the first region D1 upstream of the magnetic pole center.

With this configuration, concentration of the stator magnetic flux on the upstream end portion of the permanent magnet 30 in the rotating direction can be relaxed, and the stator magnetic flux can be distributed over the entire permanent magnet 30. This makes it possible to suppress demagnetization of the permanent magnet 30.

Since demagnetization of the permanent magnet 30 is suppressed in this manner, both of the efficiency of the motor 100 in low-speed rotation and the output of the motor 100 in high-speed rotation can be enhanced by using field-weakening control.

Since the root portion 21b of the first slit 21 intersects the magnetic pole center line M1 (that is, a straight line in the radial direction passing through the magnetic pole center), the magnetic flux of the permanent magnet 30 can be made to effectively interlink with the stator 1.

The point A positioned at the center of the tip portion 21a of the first slit 21 in the rotating direction, the point B positioned at the upstream end in the rotating direction of the outer end edge of the permanent magnet 30 in the radial direction, and the point C positioned at the magnetic pole center on the outer end edge 25a of the magnet insertion hole 25 in the radial direction form an isosceles triangle having its apex at the point A. Thus, it is possible to enhance the effect of guiding the stator magnetic flux flowing into the rotor core 20 to the downstream side in the rotating direction.

Since the minimum distance T2 between the root portion 21b of the first slit 21 and the magnet insertion hole 25 is greater than the minimum distance T1 between the tip portion 21a of the first slit 21 and the outer circumference 20a of the rotor core 20, a path for the magnetic flux of the permanent magnet 30 can be provided on the outer side of the magnet insertion hole 25 in the radial direction. Thus, the magnetic flux of the permanent magnet 30 can be made to effectively interlink with the stator 1.

Since the width W1 of the first slit 21 is constant except for a region including the tip portion 21a and a region including the root portion 21b, punching of the electromagnetic steel sheets is facilitated, and the manufacturing process is thus simplified.

Since the length L1 of the first slit 21 in the direction in which the first slit 21 extends is smaller than ½ of the length L2 of the permanent magnet 30 in the rotating direction, the first slit 21 interrupts the magnetic flux of the permanent magnet 30 as little as possible, and thus the magnetic flux of the permanent magnet 30 can be made to effectively interlink with the stator 1.

Since the width W1 of the first slit 21 is larger than the thickness of each of the electromagnetic steel sheets constituting the rotor core 20, and smaller than twice the gap G1 between the rotor 2 and the stator 1, the magnetic flux of the permanent magnet 30 can be made to effectively interlink with the stator 1. Further, punching of the electromagnetic steel sheets is facilitated, and the manufacturing process is thus simplified.

Embodiment 2

Figure 8:
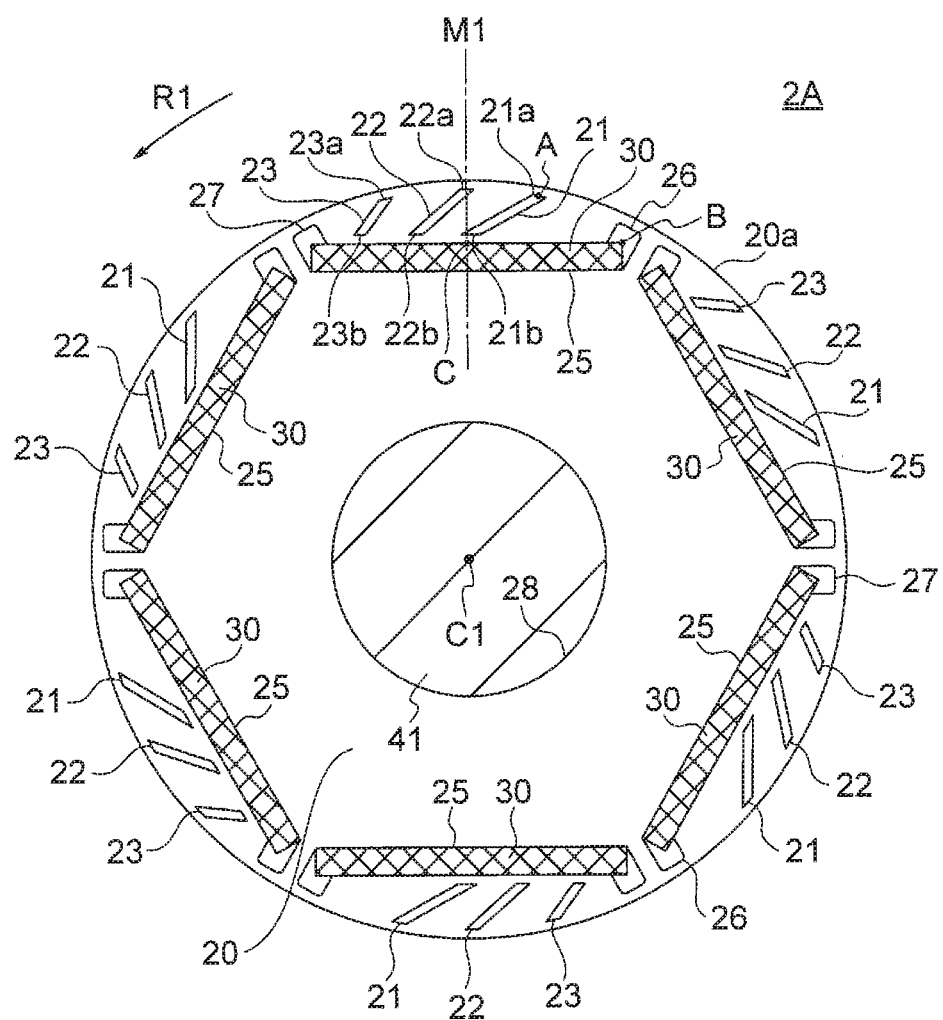
FIG. 8 is a sectional view illustrating a rotor of a motor according to Embodiment 2.

Embodiment 2 of the present invention will be described next. FIG. 8 is a sectional view illustrating a rotor 2A according to Embodiment 2. The rotor 2A according to Embodiment 2 is different from the rotor 2 according to Embodiment 1 in an arrangement of slits 21, 22, and 23.

In the rotor 2 (FIG. 2) according to Embodiment 1, the slits 21, 22, and 23 extend parallel to each other and are arranged at equal intervals in the circumferential direction. In contrast, in the rotor 2A according to Embodiment 2, the slits 21, 22, and 23 are not parallel to each other.

As in Embodiment 1, each of the slits 21, 22, and 23 is inclined with respect to the magnetic pole center line M1 so that its tip portion is located upstream of its root portion in the rotating direction. The root portions 21b, 22b, and 23b of the slits 21, 22, and 23 are disposed more in number in the second region downstream of the magnetic pole center line M1 in the rotating direction than in the first region upstream of the magnetic pole center line M1 in the rotating direction.

However, the slits 21, 22, and 23 according to Embodiment 2 extend so that the interval between the slits 21 and 22 increases outward in the radial direction, and the interval between the slits 22 and 23 increases outward in the radial direction.

More specifically, an angle of the first slit 21 with respect to the magnetic pole center line M1 is larger than an angle of the second slit 22 with respect to the magnetic pole center line M1. The angle of the second slit 22 with respect to the magnetic pole center line M1 is larger than an angle of the third slit 23 with respect to the magnetic pole center line M1.

That is, the slits 21, 22, and 23 extend so that the upstream slit in the rotating direction has a larger inclination angle with respect to the magnetic pole center line M1. In other words, the slits 21, 22, and 23 extend so that the inclination angle the first slit 21 with respect to the magnetic pole center line M1 is maximum.

In this configuration, the stator magnetic flux flowing into the rotor core 20 is guided by the slits 21, 22, and 23 to the downstream side in the rotating direction, and thus concentration of the stator magnetic flux on the upstream end portion of the permanent magnet 30 in the rotating direction is relaxed. This suppresses demagnetization at the upstream end portion of the permanent magnet 30 in the rotating direction.

The minimum distances T1 from the slits 21, 22, and 23 to the outer circumference 20a of the rotor core 20, and the minimum distances T2 from the slits 21, 22, and 23 to the magnet insertion hole 25 are the same as those described in Embodiment 1. The lengths and the widths of the slits 21, 22, and 23 are the same as those described above with reference to FIG. 3(C).

As described in Embodiment 1, the point A positioned at the center of the tip portion 21a of the first slit 21 in the circumferential direction, the point B positioned at the upstream end in the rotating direction of the outer end edge of the permanent magnet 30 in the radial direction, and the point C positioned at the magnetic pole center on the outer end edge 25a of the magnet insertion hole 25 in the radial direction form an isosceles triangle having its apex at the point A.

The rotor 2A according to Embodiment 2 is configured in a similar manner to the rotor 2 according to Embodiment 1, except for the arrangement of the slits 21, 22, and 23.

As described above, in this Embodiment 2, the stator magnetic flux flowing into the rotor core 20 is guided to the downstream side in the rotating direction by the slits 21, 22, and 23 that are not parallel to each other. Thus, demagnetization of the permanent magnet 30 can be suppressed as in Embodiment 1.

Modification.

Figure 9:
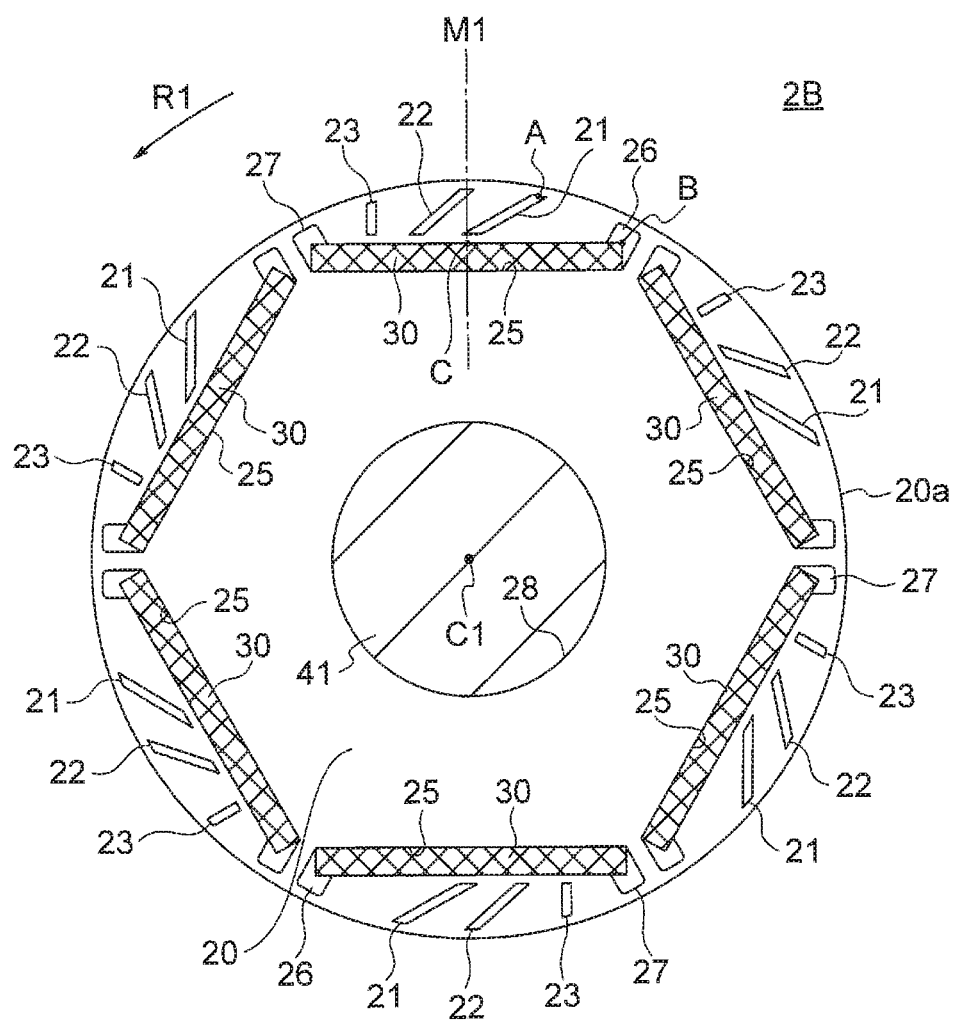
FIG. 9 is a sectional view illustrating a rotor of a motor according to a Modification to Embodiment 2.

A Modification to Embodiment 2 of the present invention will be described next. FIG. 9 is a sectional view illustrating a rotor 2B according to the Modification to Embodiment 2. The rotor 2B according to the Modification to Embodiment 2 is different from the rotor 2A according to Embodiment 2 in the arrangement of slits 23.

In the rotor 2A (FIG. 8) according to Embodiment 2, the slits 21, 22, and 23 extend so that the upstream slit in the rotating direction has a larger inclination angle with respect to the magnetic pole center line M1. In the rotor 2B according to this Modification, the third slit 23 located most downstream in the rotating direction of the slits 21, 22, and 23 extends parallel to the magnetic pole center line M1.

In this configuration, the stator magnetic flux flowing into the rotor core 20 is guide by the slits 21, 22, and 23 to the downstream side in the rotating direction, and concentration of the stator magnetic flux on the upstream end portion of the permanent magnet 30 in the rotating direction is relaxed. Thus, demagnetization at the upstream end of the permanent magnet 30 in the rotating direction.

The rotor 2B according to the Modification is configured in a similar manner to the rotor 2A according to Embodiment 2, except for the arrangement of the slits 23.

In this Modification, the stator magnetic flux flowing into the rotor core 20 is guided to the downstream side in the rotating direction by the slits 21, 22, and 23 including the third slit 23 parallel to the magnetic pole center line M1. Thus, demagnetization of the permanent magnet 30 can be suppressed as in Embodiment 1.

Embodiment 3

Figure 10:
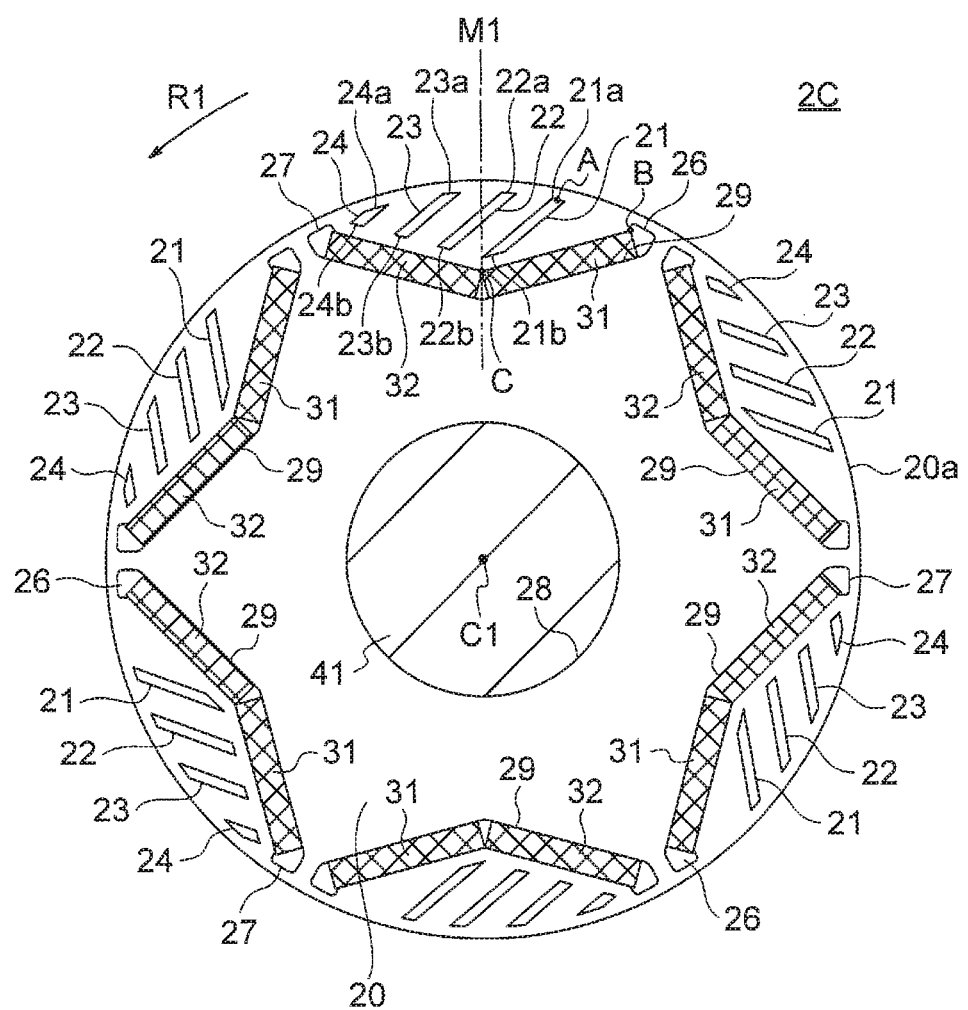
FIG. 10 is a sectional view illustrating a rotor of a motor according to Embodiment 3.

Embodiment 3 of the present invention will be described next. FIG. 10 is a sectional view illustrating a rotor 2C according to Embodiment 3. A rotor core 20 of the rotor 2C according to Embodiment 3 includes a V-shaped magnet insertion hole 29 on each magnetic pole, and two permanent magnets 31 and 32 are disposed in each magnet insertion hole 29. In each magnet insertion hole 29, the permanent magnet 31 is disposed on the upstream side in the rotating direction, and the permanent magnet 32 is disposed on the downstream side in the rotating direction.

Each magnet insertion hole 29 is formed in a V-shape such that a central portion in the circumferential direction (that is, the magnetic pole center) projects inward in the radial direction with respect to both ends in the circumferential direction. In the magnet insertion hole 29, the permanent magnets 31 and 32 are disposed on both sides of the central portion in the circumferential direction. The permanent magnets 31 and 32 are rare earth magnets, as is the case with the permanent magnets 30 described in Embodiment 1.

As the two permanent magnets 31 and 32 are disposed at one magnetic pole, loss due to eddy current flowing through the permanent magnets 31 and 32 can be reduced as compared to when one permanent magnet 30 is disposed at one magnetic pole. Since the eddy current loss is reduce, an increase in temperature of the permanent magnets 31 and 32 is suppressed. Thus, even when rare earth magnets prone to demagnetization at high temperature are used, resistance to demagnetization is further enhanced.

Flux barriers 26 and 27 which are the same as those in Embodiment 1 are formed on both sides of the magnet insertion hole 29 in the circumferential direction.

A plurality of slits 21, 22, 23, and 24 are formed on the outer side of the magnet insertion hole 29 of the rotor core 20 in the radial direction. The number of slits is four in this case, but it is sufficient that the number of slits is two or more. The slits 21, 22, 23, and 24 extend parallel to each other and are arranged at equal intervals in the circumferential direction.

The slits 21, 22, 23, and 24 are referred to as a first slit 21, a second slit 22, a third slit 23, and a fourth slit 24 in this order from the upstream side in the rotating direction indicated by an arrow R1.

Each of the slits 21, 22, 23, and 24 is inclined with respect to the magnetic pole center line M1 so that its tip portion is located upstream of its root portion in the rotating direction. The slits 21, 22, 23, and 24 extend parallel to each other and are arranged at equal intervals in the circumferential direction. However, this embodiment is not limited to such a configuration. It is sufficient that at least the first slit 21 is inclined with respect to the magnetic pole center line M1 so that the tip portion 21a is located upstream of the root portion 21b in the rotating direction.

The tip portion 21a of the first slit 21 and the tip portion 22a of the second slit 22 are located upstream of the magnetic pole center line M1 in the rotating direction. The tip portion 23a of the third slit 23 and the tip portion 24a of the fourth slit 24 are located downstream of the magnetic pole center line M1 in the rotating direction. However, this embodiment is not limited to such a configuration. It is sufficient that the tip portion 21a of the first slit 21 and the tip portion 22a of the second slit 22 are located upstream of the magnetic pole center line M1 in the rotating direction.

The root portion 21b of the first slit 21 is formed to intersect the magnetic pole center line M1. The root portion 22b of the second slit 22, the root portion 23b of the third slit 23, and the root portion 24b of the fourth slit 24 are located downstream of the magnetic pole center line M1 in the rotating direction.

In other words, the root portions 21b, 22b, 23b, and 24b of the slits 21, 22, 23, and 24 are disposed more in number in the second region downstream of the magnetic pole center line M1 in the rotating direction than in the first region upstream of the magnetic pole center line M1 in the rotating direction.

In this configuration, the stator magnetic flux flowing into the rotor core 20 are guided by the slits 21, 22, 23, and 24 to the downstream side in the rotating direction, and concentration of the stator magnetic flux on the upstream end portion of the permanent magnet 31 in the rotating direction is relaxed. Thus, demagnetization at the upstream end portion of the permanent magnet 31 in the rotating direction is suppressed.

The minimum distances from the slits 21, 22, 23, and 24 to the outer circumference 20a of the rotor core 20, and the minimum distances from the slits 21, 22, 23, and 24 to the magnet insertion hole 29 are the same as those described in Embodiment 1. The lengths and the widths of the slits 21, 22, 23, and 24 are the same as those described above with reference to FIG. 3(C).

As described in Embodiment 1, the point A positioned at the center of the tip portion 21a of the first slit 21 in the circumferential direction, the point B positioned at the upstream end in the rotating direction of the outer end edge of the permanent magnet 31 in the radial direction, and the point C positioned at the magnetic pole center on the outer end edge of the magnet insertion hole 29 in the radial direction form an isosceles triangle having its apex at the point A.

The rotor 2C according to Embodiment 3 is configured in a similar manner to the rotor 2 according to Embodiment 1, except for the arrangement of the magnet insertion holes 29 and the slits 21, 22, 23, and 24.

As described above, in this Embodiment 3, the stator magnetic flux flowing into the rotor core 20 is guided to the downstream side in the rotating direction by the slits 21, 22, 23, and 24, and demagnetization of the permanent magnet 31 can be suppressed as in Embodiment 1. Since the two permanent magnets 31 and 32 are disposed at each magnetic pole, the loss due to eddy current flowing through the permanent magnets 31 and 32 can be reduced. Thus, resistance to demagnetization can be further enhanced, even when the permanent magnets 31 and 32 are rare earth magnets prone to demagnetization at high temperature.

Embodiment 4

Figure 11:
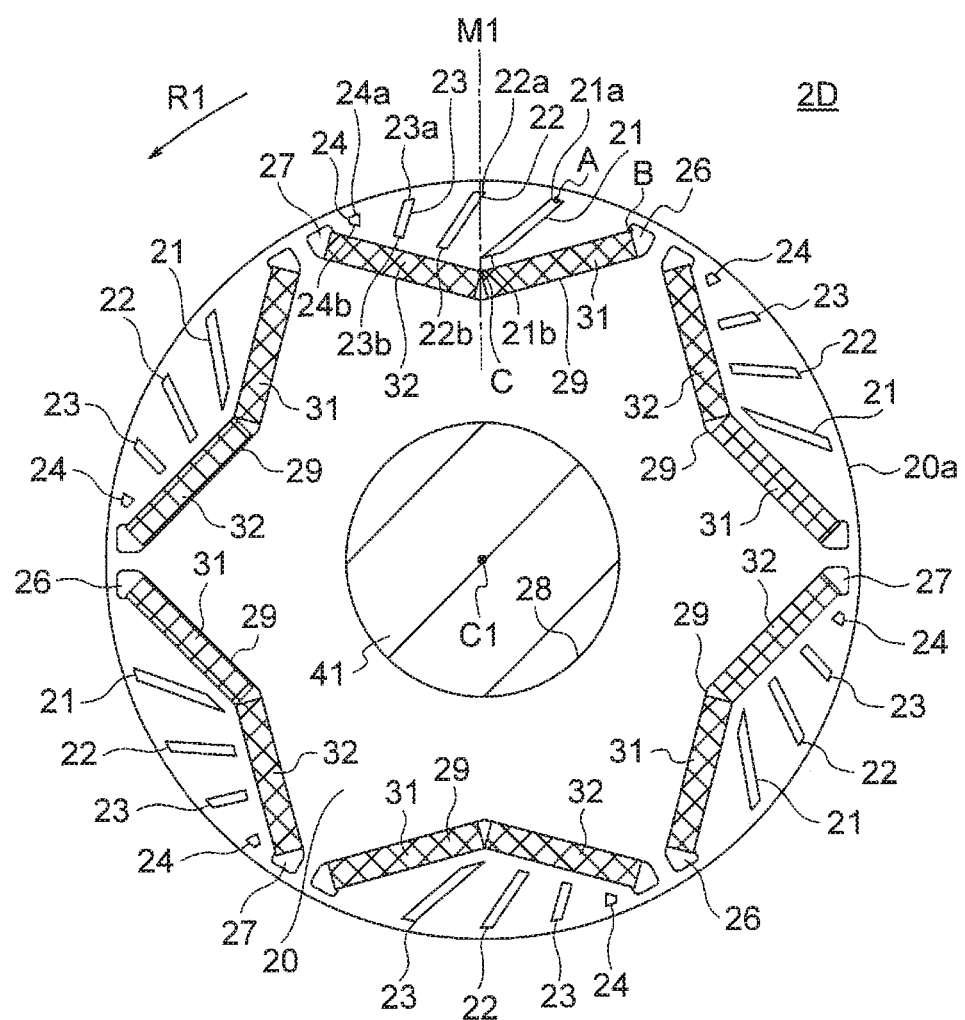
FIG. 11 is a sectional view illustrating a rotor of a motor according to Embodiment 4.

Embodiment 4 of the present invention will be described next. FIG. 11 is a sectional view illustrating a rotor 2D according to Embodiment 4. The rotor 2D according to Embodiment 4 is different from the rotor 2C according to Embodiment 3 in the arrangement of slits 21, 22, 23, and 24.

In the rotor 2C (FIG. 10) according to Embodiment 3, the slits 21, 22, 23, and 24 extend parallel to each other and are arranged at equal intervals in the circumferential direction. In contrast, in the rotor 2D according to Embodiment 4, the slits 21, 22, 23, and 24 are not parallel to each other.

As in Embodiment 3, each of the slits 21, 22, 23, and 24 is inclined with respect to the magnetic pole center line M1 so that its tip portion is located upstream of its root portion in the rotating direction. The root portions 21b, 22b, 23b, and 24b of the slits 21, 22, 23, and 24 are disposed more in number in the second region downstream of the magnetic pole center line M1 in the rotating direction than in the first region upstream of the magnetic pole center line M1 in the rotating direction.

However, the slits 21, 22, 23, and 24 according to Embodiment 4 extend so that the interval between the slits 21 and 22 increases outward in the radial direction, the interval between the slits 22 and 23 increases outward in the radial direction, and the interval between the slits 23 and 24 increases outward in the radial direction.

More specifically, the angle of the first slit 21 with respect to the magnetic pole center line M1 is larger than the angle of the second slit 22 with respect to the magnetic pole center line M1, and the angle of the second slit 22 with respect to the magnetic pole center line M1 is larger than the angle of the third slit 23 with respect to the magnetic pole center line M1. The angle of the third slit 23 with respect to the magnetic pole center line M1 is larger than the angle of the fourth slit 24 with respect to the magnetic pole center line M1.

That is, the slits 21, 22, 23, and 24 extend so that the upstream slit in the rotating direction has a larger inclination angle with respect to the magnetic pole center line M1. In other words, the slits 21, 22, 23, and 24 extend so that the inclination angle of the first slit 21 with respect to the magnetic pole center line M1 is maximum.

In this configuration, the stator magnetic flux flowing into the rotor core 20 is guided by the slits 21, 22, 23, and 24 to the downstream side in the rotating direction, and concentration of the stator magnetic flux on the upstream end portion of the permanent magnet 31 in the rotating direction is relaxed. Thus, demagnetization at the upstream end of the permanent magnet 31 in the rotating direction can be suppressed.

The minimum distances from the slits 21, 22, 23, and 24 to the outer circumference 20a of the rotor core 20, and the minimum distances from the slits 21, 22, 23, and 24 to the magnet insertion hole 29 are the same as those described in Embodiment 1. The lengths and the widths of the slits 21, 22, 23, and 24 are the same as those described above with reference to FIG. 3(C).

As described in Embodiment 1, the point A positioned at the center of the tip portion 21a of the first slit 21 in the circumferential direction, the point B positioned at the upstream end in the rotating direction of the outer end edge of the permanent magnet 31 in the radial direction, and the point C positioned at the magnetic pole center on the outer end edge of the magnet insertion hole 29 in the radial direction form an isosceles triangle having its apex at the point A.

The rotor 2D according to Embodiment 4 is configured in a similar manner to the rotor 2B according to Embodiment 3, except for the arrangement of the slits 21, 22, 23, and 24.

As described above, in this Embodiment 4, the stator magnetic flux flowing into the rotor core 20 is guided to the downstream side in the rotating direction by the slits 21, 22, 23, and 24 that are not parallel to each other, and demagnetization of the permanent magnets 31 and 32 can be suppressed as in Embodiment 1. Since the two permanent magnets 31 and 32 on each magnetic pole, the loss due to eddy current flowing through the permanent magnets 31 and 32 can be reduced. Thus, resistance to demagnetization can be further enhanced, even when the permanent magnets 31 and 23 are rare earth magnets prone to demagnetization at high temperature.

One of the slits 21, 22, 23, and 24 according to Embodiment 4, i.e., for example, the fourth slit 24 may be formed as a slit parallel to the magnetic pole center line M1 like the slit 23 according to the Modification illustrated in FIG. 9.

(Compressor)

A compressor (rotary compressor) 500 to which the motor 100 according to each Embodiment is applicable will be described next. FIG. 12 is a sectional view illustrating a configuration of the compressor 500. The compressor 500 includes a closed container 507, a compression element 501 provided in the closed container 507, and a motor 100 for driving the compression element 501. The motor 100 is the motor 100 (FIG. 1) according to Embodiment 1, but may be the motor according to Embodiment 2, 3 or 4 or the Modification.

The compression element 501 includes a cylinder 502 having a cylinder chamber 503, a shaft 41 rotated by the motor 100, a rolling piston 504 fixed to the shaft 41, a vane (not illustrated) separating the cylinder chamber 503 into a suction side and a compression side, and an upper frame 505 and a lower frame 506 through which the shaft 41 is inserted. The upper frame 505 and the lower frame 506 close end faces of the cylinder chamber 503 in the axial direction. An upper discharge muffler 508 and a lower discharge muffler 509 are mounted to the upper frame 505 and the lower frame 506, respectively.

The closed container 507 is a cylindrical container formed by, for example, drawing a steel sheet having a thickness of 3 mm. Refrigerating machine oil (not illustrated) is stored in a bottom of the closed container 507, and serves as lubricant for lubricating sliding portions of the compression element 501. The shaft 41 is rotatably held by the upper frame 505 and the lower frame 506 serving as bearing portions.

The cylinder 502 includes the cylinder chamber 503 therein, and the rolling piston 504 eccentrically rotates in the cylinder chamber 503. The shaft 41 includes an eccentric shaft portion, and the rolling piston 504 is fitted to the eccentric shaft portion.

The closed container 507 includes a cylindrical frame 42. The stator 1 of the motor 100 is fitted inside the frame 42 using a method such as shrink fitting, press fitting, or welding. Power is supplied to the windings 15 of the stator 1 via a glass terminal 511 fixed to the closed container 507. The shaft 41 is fitted into the shaft hole 28 (FIG. 1) of the rotor core 20 of the rotor 2.

An accumulator 510 for storing refrigerant gas is attached to outside of the closed container 507. A suction pipe 513 is fixed to the closed container 507, and the refrigerant gas is supplied from the accumulator 510 to the cylinder 502 via the suction pipe 513. A discharge pipe 512 for discharging the refrigerant to the outside is provided on an upper portion of the closed container 507.

As the refrigerant, R410A, R407C, or R22, for example, may be used. In view of preventing global warming, a low-GWP (Global Warming Potential) refrigerant is desirably used.

An operation of the compressor 500 is as follows. The refrigerant gas supplied from the accumulator 510 is supplied into the cylinder chamber 503 of the cylinder 502 through the suction pipe 513. When the motor 100 is driven by current supplied by the inverter and the rotor 2 rotates, the shaft 41 rotates together with the rotor 2. The rolling piston 504 fitted to the shaft 41 eccentrically rotates in the cylinder chamber 503, and the refrigerant is compressed in the cylinder chamber 503. The refrigerant compressed in the cylinder chamber 503 passes through the discharge mufflers 508 and 509, further passes through the slots 13 of the stator core 10 and spaces between the cutout portions 19 and the frame 42, and rises in the closed container 507. The refrigerant rising in the closed container 507 is discharged through the discharge pipe 512 and supplied to the high-pressure side of a refrigeration cycle.

The refrigerant compressed in the cylinder chamber 503 is mixed with the refrigeration machine oil, but separation between the refrigerant and the refrigeration machine oil is promoted when they pass through the slots 13 of the stator core 10 and the like. Thus, the refrigeration machine oil is prevented from flowing into the discharge pipe 512.

Since the motor described in each Embodiment is applicable to the motor 100 of the compressor 500, the output of the compressor 500 can be enhanced by the enhancement of the resistance to demagnetization in high-speed rotation.

The motor described in each Embodiment may be used not only for the rotary compressor but also for other types of compressors, and may be used for apparatuses other than the compressors.

(Air Conditioning Apparatus)

Figure 13:
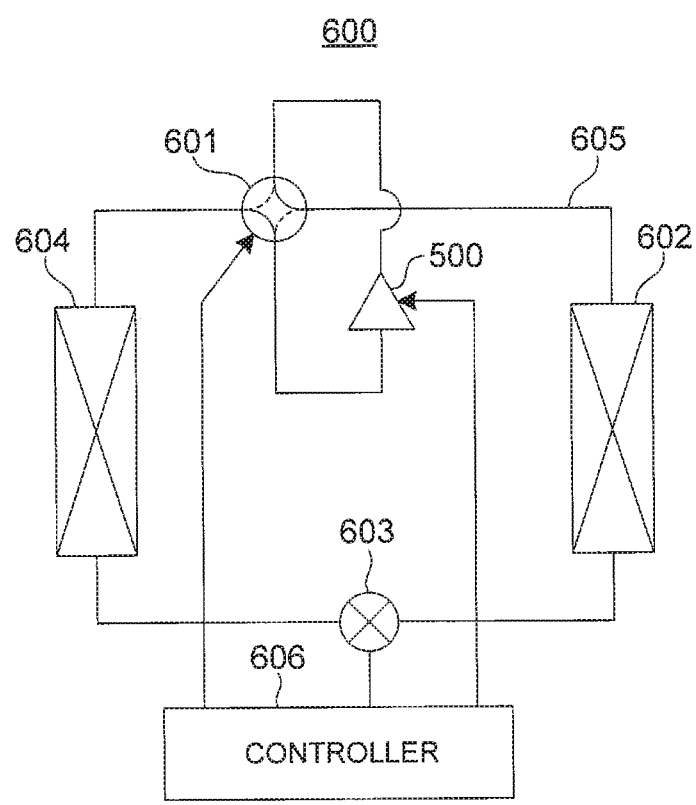
FIG. 13 is a diagram illustrating a configuration of an air conditioning apparatus including the compressor illustrated in FIG. 12.
Figure 14:
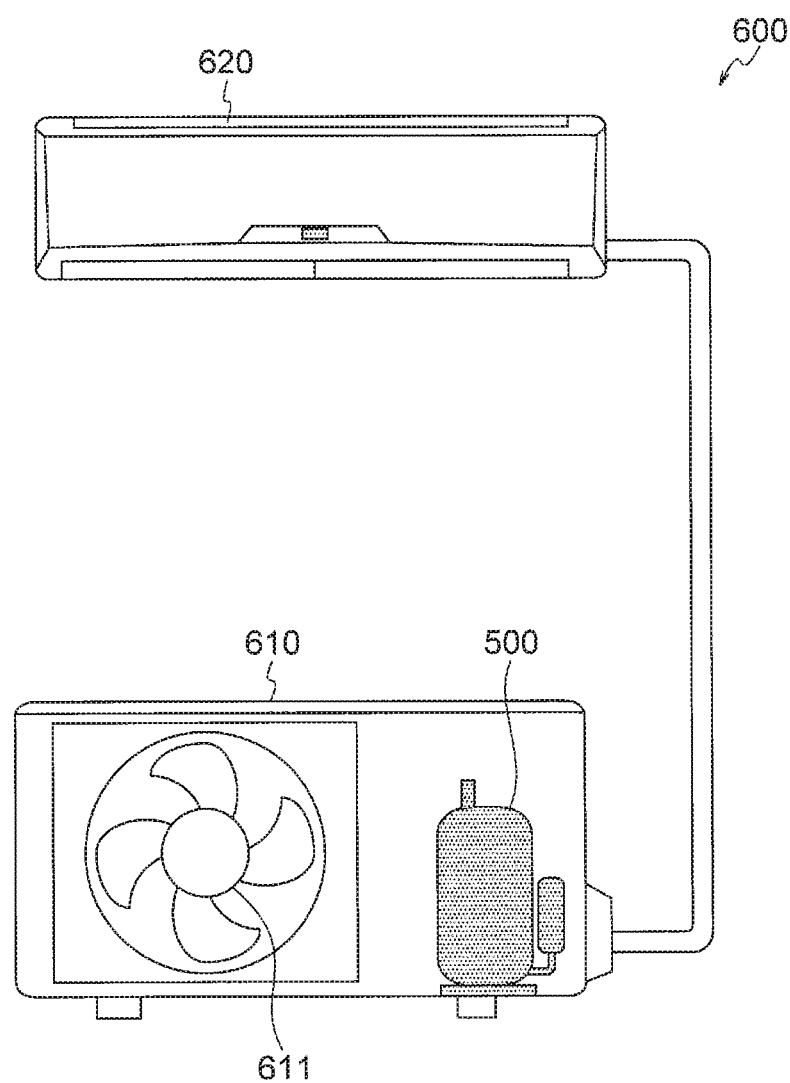
FIG. 14 is a view illustrating an outer appearance of the air conditioning apparatus including the compressor illustrated in FIG. 12.

An air conditioning apparatus 600 (refrigerating and air conditioning apparatus) including the above described compressor 500 will be described next. FIG. 13 is a diagram illustrating a configuration of the air conditioning apparatus 600. FIG. 14 is a view illustrating an outer appearance of the air conditioning apparatus 600. The air conditioning apparatus 600 illustrated in FIGS. 13 and 14 includes a compressor (rotary compressor) 500, a four-way valve 601, a condenser 602, a decompressor (expander) 603, an evaporator 604, a refrigerant pipe 605, and a controller 606. The compressor 500, the condenser 602, the decompressor 603, and the evaporator 604 are connected to each other via the refrigerant pipe 605 to form a refrigeration cycle.

The compressor 500, the four-way valve 601, the condenser 602, and the decompressor 603 are disposed in an outdoor unit 610 (FIG. 14). An outdoor fan 611 is provided in the outdoor unit 610. The evaporator 604 and the controller 606 are provided in an indoor unit 620 (FIG. 14). An indoor fan (not illustrated) is provided in the indoor unit 620. The refrigerant pipe 605 connects the outdoor unit 610 and the indoor unit 620 to each other.

An operation of the air conditioning apparatus 600 is as follows. The compressor 500 compresses sucked refrigerant and sends out the compressed refrigerant as high-temperature and high-pressure gas refrigerant. The four-way valve 601 is used to switch a direction in which the refrigerant flows, and guides the refrigerant sent from the compressor 500 to the condenser 602 in a state illustrated in FIG. 13.

The condenser 602 performs heat exchange between the refrigerant sent from the compressor 500 and outdoor air supplied by the outdoor fan 611 to condense and liquefy the refrigerant, and sends out the refrigerant. The decompressor 603 expands the liquid refrigerant sent from the condenser 602 and sends out the refrigerant as low-temperature and low-pressure liquid refrigerant.

The evaporator 604 performs heat exchange between the low-temperature and low-pressure liquid refrigerant sent from the decompressor 603 and indoor air, causes the refrigerant to absorb heat from the air and to evaporate (vaporize), and sends out the refrigerant as gas refrigerant. The air deprived of heat in the evaporator 604 is supplied by the indoor fan to the room as a target space. The operations of the four-way valve 601 and the compressor 500 are controlled by the controller 606.

Since the motor described in each Embodiment is applicable to the compressor 500 of the air conditioning apparatus 600, the operation efficiency and the reliability of the air conditioning apparatus 600 can be enhanced by the enhancement of the resistance of the motor to demagnetization in high-speed rotation.

Components other than the compressor 500 in the air conditioning apparatus 600 are not limited to the above-described configuration example.

While desirable embodiments of the present invention have been described in detail above, the present invention is not limited thereto, and various improvements or modifications may be made without departing from the gist of the present invention.

What is claimed is:

1. A motor comprising:
a rotor rotatable in a rotating direction about an axis; and a stator surrounding the rotor from an outer side in a radial direction about the axis,
the rotor comprising:
a rotor core having a magnet insertion hole corresponding to one magnetic pole; and
a permanent magnet disposed in the magnet insertion hole,
wherein the rotor core has a plurality of slits on an outer side of the magnet insertion hole in the radial direction;
wherein the plurality of slits include a first slit located most upstream in the rotating direction;
wherein each of the plurality of slits has a tip portion which is an outer end in the radial direction, and a root portion which is an inner end in the radial direction;
wherein the first slit extends so that the tip portion of the first slit is located upstream of the root portion of the first slit in the rotating direction;
wherein the tip portion of the first slit is located upstream of a magnetic pole center in the rotating direction;
wherein the root portion of the first slit intersects a straight line in the radial direction passing through the magnetic pole center; and
wherein the root portions of the plurality of slits are disposed more in number in a second region downstream of the magnetic pole center in the rotating direction than in a first region upstream of the magnetic pole center in the rotating direction.

2. The motor according to claim 1, wherein a minimum distance T2 between the root portion of the first slit and the magnet insertion hole is greater than a minimum distance T1 between the tip portion of the first slit and an outer circumference of the rotor core.

3. The motor according to claim 1, wherein the first slit has a width in a direction perpendicular to a direction in which the first slit extends, and
wherein the width of the first slit is constant except for a region including the tip portion and a region including the root portion.

4. The motor according to claim 1, wherein a length of the first slit in a direction in which the first slit extends is smaller than ½ of a length of the permanent magnet in the rotating direction.

5. The motor according to claim 1, wherein the rotor core has a structure in which a plurality of stack elements are stacked in a direction of the axis, and
wherein a width of the first slit in a direction perpendicular to a direction in which the first slit extends is larger than a thickness of each of the plurality of stack elements, and is smaller than twice a gap between the rotor and the stator.

6. The motor according to claim 1, wherein the plurality of slits extend parallel to each other.

7. The motor according to claim 1, wherein the magnet insertion hole extends linearly in a direction perpendicular to a straight line in the radial direction passing through the magnetic pole center.

8. The motor according to claim 1, wherein the magnet insertion hole extends in a V-shape such that a central portion of the magnet insertion hole in the rotating direction projects inward in the radial direction with respect to both ends of the magnet insertion hole in the rotating direction, and
wherein two permanent magnets are disposed in the magnet insertion hole.

9. The motor according to claim 1, wherein the permanent magnet comprises a rare earth magnet containing neodymium (Nd), iron (Fe), and boron (B).

10. A compressor comprising:
the motor according to claim 1; and
a compression element driven by the motor.

11. An air conditioning apparatus comprising a compressor, a condenser, a decompressor, and an evaporator,
the compressor comprising:
the motor according to claim 1, and
a compression element driven by the motor.

12. A motor comprising:
a rotor rotatable in a rotating direction about an axis; and
a stator surrounding the rotor from an outer side in a radial direction about the axis,
the rotor comprising:
a rotor core having a magnet insertion hole corresponding to one magnetic pole; and
a permanent magnet disposed in the magnet insertion hole,
wherein the rotor core has a plurality of slits on an outer side of the magnet insertion hole in the radial direction;
wherein the plurality of slits include a first slit located most upstream in the rotating direction;
wherein each of the plurality of slits has a tip portion which is an outer end in the radial direction, and a root portion which is an inner end in the radial direction;
wherein the first slit extends so that the tip portion of the first slit is located upstream of the root portion of the first slit in the rotating direction;
wherein the tip portion of the first slit is located upstream of a magnetic pole center in the rotating direction;
wherein the root portions of the plurality of slits are disposed more in number in a second region downstream of the magnetic pole center in the rotating direction than in a first region upstream of the magnetic pole center in the rotating direction; and
wherein a point A positioned at a center of the tip portion of the first slit in the rotating direction, a point B positioned at an upstream end in the rotating direction of an outer end edge of the permanent magnet in the radial direction, and a point C positioned at the magnetic pole center on an outer end edge of the magnet insertion hole in the radial direction form an isosceles triangle having an apex at the point A.

13. A compressor comprising:
the motor according to claim 12; and
a compression element driven by the motor.

14. An air conditioning apparatus comprising a compressor, a condenser, a decompressor, and an evaporator,
the compressor comprising:
the motor according to claim 12, and
a compression element driven by the motor.

15. A motor comprising:
a rotor rotatable in a rotating direction about an axis; and
a stator surrounding the rotor from an outer side in a radial direction about the axis,
the rotor comprising:
a rotor core having a magnet insertion hole corresponding to one magnetic pole; and
a permanent magnet disposed in the magnet insertion hole,
wherein the rotor core has a plurality of slits on an outer side of the magnet insertion hole in the radial direction;
wherein the plurality of slits include a first slit located most upstream in the rotating direction;
wherein each of the plurality of slits has a tip portion which is an outer end in the radial direction, and a root portion which is an inner end in the radial direction;

wherein the first slit extends so that the tip portion of the first slit is located upstream of the root portion of the first slit in the rotating direction;

wherein the tip portion of the first slit is located upstream of a magnetic pole center in the rotating direction;

wherein the root portions of the plurality of slits are disposed more in number in a second region downstream of the magnetic pole center in the rotating direction than in a first region upstream of the magnetic pole center in the rotating direction; and wherein the plurality of slits extend so that the first slit has a largest angle with respect to a straight line in the radial direction passing through the magnetic pole center.

16. The motor according to claim 15, wherein the plurality of slits include a slit extending parallel to the straight line in the radial direction passing through the magnetic pole center.

17. A compressor comprising:
the motor according to claim 15; and
a compression element driven by the motor.

18. An air conditioning apparatus comprising a compressor, a condenser, a decompressor, and an evaporator,
the compressor comprising:
the motor according to claim 15, and
a compression element driven by the motor.

* * * * *